(12) United States Patent
Takeda et al.

(10) Patent No.: US 12,031,192 B2
(45) Date of Patent: Jul. 9, 2024

(54) CONTINUOUS HOT-DIP GALVANIZING APPARATUS

(71) Applicant: JFE STEEL CORPORATION, Chiyoda-ku Tokyo (JP)

(72) Inventors: Gentaro Takeda, Tokyo (JP); Hideyuki Takahashi, Tokyo (JP); Tetsuya Iwata, Tokyo (JP); Koji Sawamura, Tokyo (JP)

(73) Assignee: JFE STEEL CORPORATION, Chiyoda-ku Tokyo (JP)

(*) Notice: Subject to any disclaimer, the term of this patent is extended or adjusted under 35 U.S.C. 154(b) by 0 days.

(21) Appl. No.: 18/332,752

(22) Filed: Jun. 12, 2023

(65) Prior Publication Data

US 2023/0323501 A1 Oct. 12, 2023

Related U.S. Application Data

(62) Division of application No. 16/955,041, filed as application No. PCT/JP2018/042900 on Nov. 20, 2018, now Pat. No. 11,718,889.

(30) Foreign Application Priority Data

Dec. 22, 2017 (JP) .................................. 2017-246959

(51) Int. Cl.
*C21D 9/46* (2006.01)
*C21D 1/26* (2006.01)
(Continued)

(52) U.S. Cl.
CPC ................. *C21D 9/46* (2013.01); *C21D 1/26* (2013.01); *C21D 9/561* (2013.01); *C21D 9/562* (2013.01);
(Continued)

(58) Field of Classification Search
None
See application file for complete search history.

(56) References Cited

U.S. PATENT DOCUMENTS 5,916,378 A 6/1999 Bailey et al.
6,562,473 B1 * 5/2003 Okabe ................. H01F 1/14775
148/310

(Continued)

FOREIGN PATENT DOCUMENTS

CN 101287854 A 10/2008
EP 2806043 A1 11/2014
(Continued)

OTHER PUBLICATIONS

Machine Translation of JP-2009209397-A (Year: 2009).*
(Continued)

*Primary Examiner* — Keith Walker
*Assistant Examiner* — Ryan L Heckman
(74) *Attorney, Agent, or Firm* — KENJA IP LAW PC (57) ABSTRACT

Provided is a continuous hot-dip galvanizing apparatus comprising: a vertical annealing furnace having heating, soaking zone, and cooling zones therein; and a hot-dip galvanizing line downstream of the cooling zone. The heating, soaking, and cooling zones each have, in its upper portion, at least one upper hearth roll and, in its lower portion, at least one lower hearth roll. The soaking zone has a first and second humidified gas supply ports to supply a humidified gas having a dew point of 10° C. to 30° C. to the soaking zone. The first and second humidified gas supply ports are 1.0 m to 5.0 m lower than the center of the lower and upper hearth rolls, respectively, and overlap the steel sheet. The first humidified gas supply port is provided only for an ascending pass and the second humidified gas supply port is provided only for a descending pass.

6 Claims, 2 Drawing Sheets

(51) Int. Cl.
- *C21D 9/56* (2006.01)
- *C22C 38/02* (2006.01)
- *C23C 2/00* (2006.01)
- *C23C 2/02* (2006.01)
- *C23C 2/06* (2006.01)
- *C23C 2/28* (2006.01)
- *C23C 2/40* (2006.01)

(52) U.S. Cl.
CPC ............ *C22C 38/02* (2013.01); *C23C 2/0035* (2022.08); *C23C 2/0038* (2022.08); *C23C 2/004* (2022.08); *C23C 2/0224* (2022.08); *C23C 2/06* (2013.01); *C23C 2/28* (2013.01); *C23C 2/40* (2013.01)

(56) References Cited

U.S. PATENT DOCUMENTS

| | | |
|---|---|---|
| 10,415,115 B2 | 9/2019 | Takahashi et al. |
| 2006/0037679 A1 | 2/2006 | Raick et al. |
| 2009/0123651 A1 | 5/2009 | Okada |
| 2013/0270724 A1 | 10/2013 | Albro et al. |
| 2013/0273251 A1* | 10/2013 | Takahashi ............... C21D 9/56 266/44 |
| 2016/0265079 A1 | 9/2016 | Takahashi et al. |
| 2017/0130296 A1* | 5/2017 | Takeda ................. C23C 2/0224 |
| 2017/0137906 A1 | 5/2017 | Fan et al. |
| 2017/0240988 A1 | 8/2017 | Imamura et al. |
| 2018/0051356 A1* | 2/2018 | Takeda ................. C23C 2/0035 |
| 2018/0237896 A1* | 8/2018 | Takeda ................. C23C 2/0222 |
| 2020/0325568 A1* | 10/2020 | Jin ............................ C21D 3/02 |

FOREIGN PATENT DOCUMENTS

| | | |
|---|---|---|
| EP | 2960348 A1 | 12/2015 |
| EP | 3168321 A1 | 5/2017 |
| EP | 3243924 A1 | 11/2017 |
| JP | 2009209397 A * | 9/2009 |
| JP | 2009209397 A | 9/2009 |
| JP | 2010202959 A | 9/2010 |
| JP | 2016017193 A | 2/2016 |
| JP | 2016125131 A | 7/2016 |
| WO | 2007043273 A1 | 4/2007 |
| WO | 2015068369 A1 | 5/2015 |

OTHER PUBLICATIONS

Feb. 12, 2019, International Search Report issued in the International Patent Application No. PCT/JP2018/042900.

Nov. 17, 2020, the Extended European Search Report issued by the European Patent Office in the corresponding European Patent Application No. 18889989.2.

Oct. 29, 2021, Office Action issued by the China National Intellectual Property Administration in the corresponding Chinese Patent Application No. 201880081834.6 with English language search report.

* cited by examiner

CONTINUOUS HOT-DIP GALVANIZING APPARATUS

CROSS-REFERENCE TO RELATED APPLICATIONS

The present application is a divisional application of U.S. patent application Ser. No. 16/955,041 filed Jun. 18, 2020, which is a National Stage Application of PCT/JP2018/042900 filed Nov. 20, 2018, which claims priority of Japanese Patent Application No. 2017-246959 filed Dec. 22, 2017. The disclosures of the prior applications are hereby incorporated by reference herein in their entirety.

TECHNICAL FIELD

This disclosure relates to a continuous hot-dip galvanizing apparatus that includes: a vertical annealing furnace in which a heating zone, a soaking zone, and a cooling zone are arranged in this order; and a hot-dip galvanizing line located downstream of the cooling zone, and a method for producing a hot-dip galvanized steel sheet using the apparatus.

BACKGROUND

In recent years, the demand for high tensile strength steel sheets which contribute to more lightweight structures and the like is increasing in the fields of automobiles, household appliances, building products, etc. As high tensile strength steel sheets, for example, it is known that a steel sheet with good hole expandability can be produced by containing Si in steel, and a steel sheet with good ductility where retained austenite (γ) forms easily can be produced by containing Si or Al in steel.

However, in the case of producing a hot-dip galvanized steel sheet using, as a base material, a high tensile strength steel sheet containing a large amount of Si (particularly, 0.2 mass % or more), the following problem arises. The hot-dip galvanized steel sheet is produced by, after subjecting the steel sheet as the base material to heat-annealing at a temperature of about 600° C. to 900° C. in a reducing atmosphere or a non-oxidizing atmosphere, and hot-dip galvanizing the steel sheet. Further, by heat-alloying the galvanized coating on the steel sheet, a galvannealed steel sheet can be produced.

Here, Si in the steel is an oxidizable element, and is selectively oxidized in a typically used reducing atmosphere or non-oxidizing atmosphere and concentrated in the surface of the steel sheet to form an oxide. This oxide decreases wettability with molten zinc in the galvanizing process and causes non-coating. With an increase of the Si concentration in the steel, wettability decreases rapidly and non-coating occurs frequently. Even in the case where non-coating does not occur, there is still a problem of poor coating adhesion properties. Besides, if Si in the steel is selectively oxidized and concentrated in the surface of the steel sheet, a significant alloying delay arises in the alloying process after the hot-dip galvanizing, leading to considerably lower productivity.

In view of such problems, for example, JP 2010-202959 A (PTL 1) describes the following method. With use of a direct fired furnace (DFF), the surface of a steel sheet is oxidized and then the steel sheet is subjected to annealing in a reducing atmosphere to internally oxidize Si and prevent Si from being concentrated in the surface of the steel sheet, thus improving the wettability and adhesion properties of the hot-dip galvanized coating. PTL 1 describes that the reducing annealing after heating may be performed by a conventional method (dew point: −30° C. to −40° C.).

WO 2007/043273 A1 (PTL 2) describes the following technique. In a continuous annealing and hot-dip coating method that uses an annealing furnace having an upstream heating zone, a downstream heating zone, a soaking zone, and a cooling zone arranged in this order and a hot-dip molten bath, annealing is performed under the following conditions such that Si is internally oxidized and prevented from being concentrated in the surface of the steel sheet: heating or soaking the steel sheet at a steel sheet temperature in the range of at least 300° C. by indirect heating; setting the atmosphere inside the furnace in each zone to an atmosphere of 1 vol % to 10 vol % hydrogen with the balance being nitrogen and inevitable impurities; setting the steel sheet end-point temperature during heating in the upstream heating zone to 550° C. or higher and 750° C. or lower and a dew point in the upstream heating zone to lower than −25° C.; setting dew points in the subsequent downstream heating zone and soaking zone to −30° C. or higher and 0° C. or lower; and setting a dew point in the cooling zone to lower than −25° C. PTL 2 also provides that mixed gas of nitrogen and hydrogen is humidified and introduced into the downstream heating zone and/or the soaking zone.

JP 2016-017193 A (PTL 3) describes the following technique. In a method for producing an galvannealed steel sheet including: conveying a steel strip to a heating zone, a soaking zone, and a cooling zone in this order in an annealing furnace to subject the steel strip to annealing, hot-dip galvanizing the steel strip discharged from the cooling zone, and heat alloying the galvanized coating, in which reducing gas or non-oxidizing gas is supplied into the soaking zone, the reducing gas or the non-oxidizing gas including: mixed gas obtained by mixing humidified gas and dry gas, the mixed gas is supplied into the soaking zone from at least one gas supply port located in a region of lower ½ of the soaking zone in a height direction, and a dew point measured in a region of upper ⅕ and a dew point measured in a region of lower ⅕ of the soaking zone in a height direction are controlled to −20° C. or higher and 0° C. or lower.

CITATION LIST

Patent Literatures

PTL 1: JP 2010-202959 A
PTL 2: WO 2007/043273 A1
PTL 3: JP 2016-017193 A

SUMMARY

Technical Problem

However, with the method described in PTL 1, although the coating adhesion properties after the reduction are good, the amount of Si internally oxidized tends to be insufficient, and Si in the steel causes the alloying temperature to be higher than typical temperature by 30° C. to 50° C., as a result of which the tensile strength of the steel sheet decreases. If the oxidation amount is increased to ensure a sufficient amount of Si internally oxidized, oxide scale attaches to rolls in the annealing furnace, inducing pressing flaws, i.e. pick-up defects, in the steel sheet. The means for simply increasing the oxidation amount is therefore not applicable.

With the method described in PTL 2, since the heating or soaking in the upstream heating zone, downstream heating zone, and soaking zone is performed by indirect heating, the oxidation of the surface of the steel sheet like that by direct firing in PTL 1 is unlikely to occur. When the dew point can be controlled in a predetermined range in the steel sheet temperature range described in PTL 2, good coating adhesion properties and alloying temperature control can be achieved. However, it was found that when the dew point is raised to about 0° C. near a hearth roll, a surface coating of the steel sheet reacts with a roll thermal sprayed coating, inducing pick-up defects. Further, gas in the annealing furnace flows from a downstream side to an upstream side of the line, that is, from the cooling zone to the heating zone. When only dry gas is supplied to the cooling zone, the gas dew point in a high temperature range at which a Si internal oxidation reaction easily occurs is lowered even through slight flow rate change and the amount of Si internally oxidized becomes insufficient. Thus, the coating adhesion properties are deteriorated and an uncoated portion is generated, which makes it difficult to produce products stably.

It was found that the method described in PTL 3 has the following problem because humidified gas is supplied from a portion lower than ½ of the soaking zone in a height direction. Specifically, when the humidified gas supply port is near a descending pass of the steel sheet, gas with a high dew point accompanies the steel sheet and reaches a lower hearth roll in the soaking zone, generating pick-up defects in the lower hearth roll. On the other hand, the humidified gas does not reach the region of the descending pass of the steel sheet in the upper portion of the soaking zone and the dew point is not sufficiently raised. Therefore, the amount of Si internally oxidized becomes insufficient to deteriorate the coating adhesion properties.

It could thus be helpful to provide a method for producing a hot-dip galvanized steel sheet whereby good coating appearance can be obtained with high coating adhesion properties in the case of hot-dip galvanizing a steel sheet whose Si content is 0.2 mass % or more, and a continuous hot-dip galvanizing apparatus.

Solution to Problem

We acquired an idea of uniformly dispersing humidified gas in the soaking zone, using a steel sheet accompanying gas flow caused by conveyance of a steel sheet and focused on the positional relationship between the conveyance direction of the steel sheet in the soaking zone and the humidified gas supply port in the soaking zone. Specifically, when a first humidified gas supply port is provided so as to overlap the steel sheet in an ascending pass when viewed from the side of the soaking zone and located in a lower portion of the soaking zone, humidified gas supplied from the first humidified gas supply port to the soaking zone is dispersed in an upward direction along with the steel sheet accompanying gas flow. Similarly, when a second humidified gas supply port is provided so as to overlap the steel sheet in an descending pass when viewed from the side of the soaking zone and located in an upper portion of the soaking zone, humidified gas supplied from the second humidified gas supply port to the soaking zone is dispersed in a downward direction along with the steel sheet accompanying gas flow. We found that since the humidified gas is uniformly dispersed in the soaking zone by locating the humidified gas supply ports like this, a uniform dew point distribution can be obtained in the soaking zone. That is, since the soaking zone has no range in which the dew point is not sufficiently raised, that is, in which Si internal oxidation is insufficient, the coating adhesion properties are not deteriorated and good coating appearance can be obtained. Further, since the dew point near the hearth roll is not locally raised, the occurrence of pick-up defects can be suppressed, which leads to good appearance.

The primary features of this disclosure, which was developed based on the above findings, are as follows.

(1) A method for producing a hot-dip galvanized steel sheet using a continuous hot-dip galvanizing apparatus that includes: a vertical annealing furnace in which a heating zone, a soaking zone, and a cooling zone are arranged in this order; and a hot-dip galvanizing line located downstream of the cooling zone,
the method comprising:
subjecting a steel sheet to annealing by conveying the steel sheet through the heating zone, the soaking zone, and the cooling zone in the stated order in the annealing furnace, in which the steel sheet is conveyed in an upward direction to form one pass and in a downward direction to form another pass along a steel sheet conveyance path respectively in the heating zone, the soaking zone, and the cooling zone while passing through at least one upper hearth roll provided in an upper portion of each of the heating zone, the soaking zone, and the cooling zone and at least one lower hearth roll provided in a lower portion of each of the heating zone, the soaking zone, and the cooling zone; and
applying a hot-dip galvanized coating on the steel sheet discharged from the cooling zone, using the hot-dip galvanizing line, wherein
humidified gas is supplied to the soaking zone in a manner such that:
in the pass in which the steel sheet moves upward, the humidified gas is supplied from a first humidified gas supply port provided at a position that is higher by 1.0 m or more and 5.0 m or less than the center of the lower hearth roll and that overlaps the steel sheet in the pass when viewed from the side of the soaking zone; and
in the pass in which the steel sheet moves downward, the humidified gas is supplied from a second humidified gas supply port provided at a position that is lower by 1.0 m or more and 5.0 m or less than the center of the upper hearth roll and that overlaps the steel sheet in the pass when viewed from the side of the soaking zone.

(2) The method for producing a hot-dip galvanized steel sheet according to (1), wherein the first humidified gas supply port is provided at a position that is lower by 2.0 m or more than the center of the upper hearth roll and the second humidified gas supply port is provided at a position that is higher by 2.0 m or more than the center of the lower hearth roll.

(3) The method for producing a hot-dip galvanized steel sheet according to (1) or (2), wherein
the cooling zone is provided with at least one cooling nozzle along the steel sheet conveyance path, and
humidified gas is supplied to the cooling zone, in which the humidified gas is supplied from a third humidified gas supply port provided at a position within 3.0 m on an upstream side of the steel sheet conveyance path from a most upstream position of the cooling nozzle.

(4) The method for producing a hot-dip galvanized steel sheet according to any one of (1) to (3), wherein the soaking zone and the cooling zone communicate with each other through a communication portion provided with a fourth humidified gas supply port, and humidified gas is supplied from the fourth gas supply port to the communication portion.
(5) The method for producing a hot-dip galvanized steel sheet according to any one of (1) to (4), wherein in the soaking zone, dew points near the upper hearth roll and the lower hearth roll, respectively, are set to −10° C. or lower and dew points at positions 1.0 m or more away from the upper hearth roll and the lower hearth roll, respectively, are set to −20° C. or higher and 0° C. or lower.
(6) The method for producing a hot-dip galvanized steel sheet according to any one of (1) to (5), wherein
  the continuous hot-dip galvanizing apparatus further includes an alloying line located downstream of the hot-dip galvanizing line, and
  the method further comprises heat-alloying the hot-dip galvanized coating applied on the steel sheet using the alloying line.
(7) The method for producing a hot-dip galvanized steel sheet according to any one of (1) to (6), wherein the soaking zone has a height of 20 m or more and 40 m or less.
(8) A continuous hot-dip galvanizing apparatus comprising: a vertical annealing furnace in which a heating zone, a soaking zone, and a cooling zone are arranged in this order; and a hot-dip galvanizing line located downstream of the cooling zone, wherein
  the heating zone, the soaking zone, and the cooling zone each has, in its upper portion, at least one upper hearth roll and, in its lower portion, at least one lower hearth roll to convey a steel sheet in an upward direction to form one pass and in a downward direction to form another pass along a steel sheet conveyance path in the heating zone, the soaking zone, and the cooling zone,
  the soaking zone has, in the pass in which the steel sheet moves upward, a first humidified gas supply port provided at a position that is higher by 1.0 m or more and 5.0 m or less than the center of the lower hearth roll and that overlaps the steel sheet in the pass when viewed from the side of the soaking zone, and
  the soaking zone has, in the pass in which the steel sheet moves downward, a second humidified gas supply port provided at a position that is lower by 1.0 m or more and 5.0 m or less than the center of the upper hearth roll and that overlaps the steel sheet in the pass when viewed from the side of the soaking zone.
(9) The continuous hot-dip galvanizing apparatus according to (8), wherein the first humidified gas supply port is provided at a position that is lower by 2.0 m or more than the center of the upper hearth roll and the second humidified gas supply port is provided at a position that is higher by 2.0 m or more than the center of the lower hearth roll.
(10) The continuous hot-dip galvanizing apparatus according to (8) or (9), further comprising:
  at least one cooling nozzle provided along the steel sheet conveyance line in the cooling zone; and
  a third humidified gas supply port provided at a position within 3.0 m on an upstream side of the steel sheet conveyance path from a most upstream position of the cooling nozzle.
(11) The continuous hot-dip galvanizing apparatus according to any one of (8) to (10), further comprising a fourth humidified gas supply port provided in a communication portion connecting the soaking zone and the cooling zone.
(12) The continuous hot-dip galvanizing apparatus according to any one of (8) to (11), further comprising an alloying line located downstream of the hot-dip galvanizing line.
(13) The continuous hot-dip galvanizing apparatus according to any one of (8) to (12), wherein the soaking zone has a height of 20 m or more and 40 m or less.

Advantageous Effect

According to the method for producing a hot-dip galvanized steel sheet and the continuous hot-dip galvanizing apparatus of this disclosure, good coating appearance can be obtained with high coating adhesion properties in the case of hot-dip galvanizing a steel sheet whose Si content is 0.2 mass % or more.

BRIEF DESCRIPTION OF THE DRAWINGS

In the accompanying drawings.

DETAILED DESCRIPTION

Figure 1:
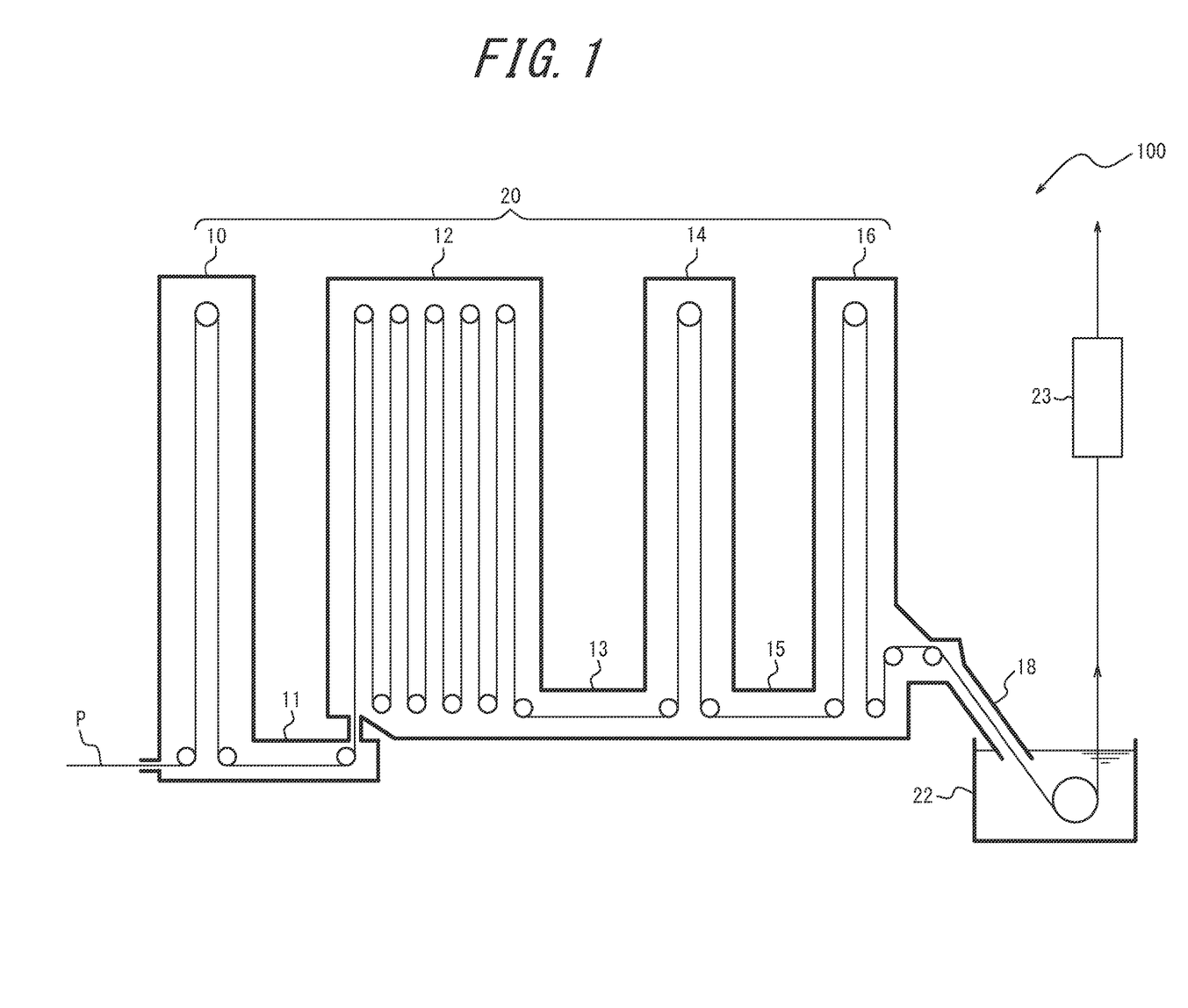
FIG. 1 is a schematic diagram illustrating the structure of a continuous hot-dip galvanizing apparatus 100 used in one of the disclosed embodiments.

With reference to FIG. 1, the configuration of a continuous hot-dip galvanizing apparatus 100 used in the method for producing a hot-dip galvanized steel sheet according to one of the disclosed embodiments is described first. The continuous hot-dip galvanizing apparatus 100 includes: a vertical annealing furnace 20 in which a heating zone 10, a soaking zone 12, and cooling zones 14 and 16 are arranged in this order; a hot-dip galvanizing bath 22 as a hot-dip galvanizing line located downstream in a steel sheet passing direction of the cooling zone 16; and an alloying line 23 located downstream in the steel sheet passing direction of the hot-dip galvanizing bath 22. In the disclosed embodiment, the cooling zone includes a first cooling zone 14 (rapid cooling zone) and a second cooling zone 16 (slow cooling zone). A snout 18 connected to the second cooling zone 16 has its tip immersed in the hot-dip galvanizing bath 22, thus connecting the annealing furnace 20 and the hot-dip galvanizing bath 22.

A steel sheet (steel strip) P is introduced from a steel sheet introduction port in a lower portion of the heating zone 10 into the heating zone 10. At least one hearth roll is arranged in the upper and lower portions in each of the zones 10, 12, 14, and 16. In the case where the steel sheet P is folded back by 180 degrees at the hearth roll, the steel sheet P is conveyed in an upward direction to form one pass and in a downward direction to form another pass inside a predetermined zone of the annealing furnace 20. While FIG. 1 illustrates an example of having two passes in the heating zone 10, ten passes in the soaking zone 12, two passes in the first cooling zone 14, and two passes in the second cooling zone 16, the numbers of passes are not limited to such and may be set as appropriate depending on treatment conditions. At some hearth rolls, the steel sheet P is not folded back but changed in direction at the right angle to move to the next zone. The steel sheet P is thus annealed in the annealing furnace 20 by being conveyed through the heating zone 10, the soaking zone 12, and the cooling zones 14 and 16 in this order.

The zones 10, 12, 14, and 16 are vertical furnaces and the height of the furnaces is not particularly limited but may be about 20 m to 40 m. Further, the length of each zone (in the horizontal direction in FIG. 1) may be determined as appropriate depending on the number of passes in the zone. For example, the heating zone 10 having two passes may have a length of about 0.8 m to 2 m, the soaking zone 12 having ten passes may have a length of about 10 m to 20 m, the first cooling zone 14 and the second cooling zone 16 having two passes each may have a length of about 0.8 m to 2 m.

Adjacent zones in the annealing furnace 20 communicate through a communication portion connecting the upper or lower portions of the respective zones. In this embodiment, the heating zone 10 and the soaking zone 12 communicate through a throat (restriction portion) 11 connecting the lower portions of the respective zones. The soaking zone 12 and the first cooling zone 14 communicate through a throat 13 connecting the lower portions of the respective zones. The first cooling zone 14 and the second cooling zone 16 communicate through a throat 15 connecting the lower portions of the respective zones. The height of each throat may be set as appropriate. Meanwhile, the height of each throat is preferably as low as possible, to enhance the independence of the atmosphere in each zone. The gas in the annealing furnace 20 flows from downstream to upstream in the furnace, and is discharged from the steel sheet introduction port in the lower portion of the heating zone 10.

(Heating Zone)

In this embodiment, the heating zone 10 can indirectly heat the steel sheet P using a radiant tube (RT) or an electric heater. The average temperature in the heating zone 10 is preferably set to 500° C. to 800° C. To the heating zone 10, gas is flowed from the soaking zone 12, while at the same time reducing gas or non-oxidizing gas is separately supplied. As the reducing gas, a $H_2$—$N_2$ mixed gas is typically used. The reducing gas includes gas (dew point: about −60° C.) having a composition containing 1 vol % to 20 vol % $H_2$ with the balance being $N_2$ and inevitable impurities. Further, the non-oxidizing gas includes gas (dew point: about −60° C.) having a composition containing $N_2$ and inevitable impurities. The gas supply to the heating zone 10 is not particularly limited but the gas is preferably supplied from at least two supply ports in the height direction and at least one supply port in the longitudinal direction so that the gas is uniformly introduced into the heating zone. The gas flow rate of the gas supplied to the heating zone is measured by a gas flowmeter (not illustrated) provided in the pipe. The gas flow rate is not particularly limited but may be about 10 ($Nm^3$/hr) to 100 ($Nm^3$/hr).

(Soaking Zone)

In this embodiment, the soaking zone 12 can indirectly heat the steel sheet P using a radiant tube (not illustrated) as heating means. The average temperature in the soaking zone 12 is preferably set to 700° C. to 900° C.

Reducing gas or non-oxidizing gas is supplied to the soaking zone 12. As the reducing gas, $H_2$—$N_2$ mixed gas is typically used. The reducing gas includes gas (dew point: about −60° C.) having a composition containing 1 vol % to 20 vol % $H_2$ with the balance being $N_2$ and inevitable impurities. Further, the non-oxidizing gas includes gas (dew point: about −60° C.) having a composition containing $N_2$ and inevitable impurities.

In this embodiment, the gas supplied to the soaking zone 12 has two forms, namely, humidified gas and dry gas. Here, "dry gas" is the reducing gas or non-oxidizing gas that has a dew point of about −60° C. to −50° C. and that is not humidified by a humidifying device, and "humidified gas" is the gas that is humidified by the humidifying device so as to have a dew point of 10° C. to 30° C.

In producing a high tensile strength steel sheet having a chemical composition containing Si in an amount of 0.2 mass % or more, in order to raise the dew point in the soaking zone, dry gas and humidified gas are supplied to the soaking zone 12. On the other hand, in producing a steel sheet having a Si content of less than 0.2 mass % (for example, a common steel sheet having a tensile strength of about 270 MPa), in order to avoid the oxidation of a steel sheet surface, only dry gas is supplied to the soaking zone 12 and mixed gas is not supplied.

Figure 2:
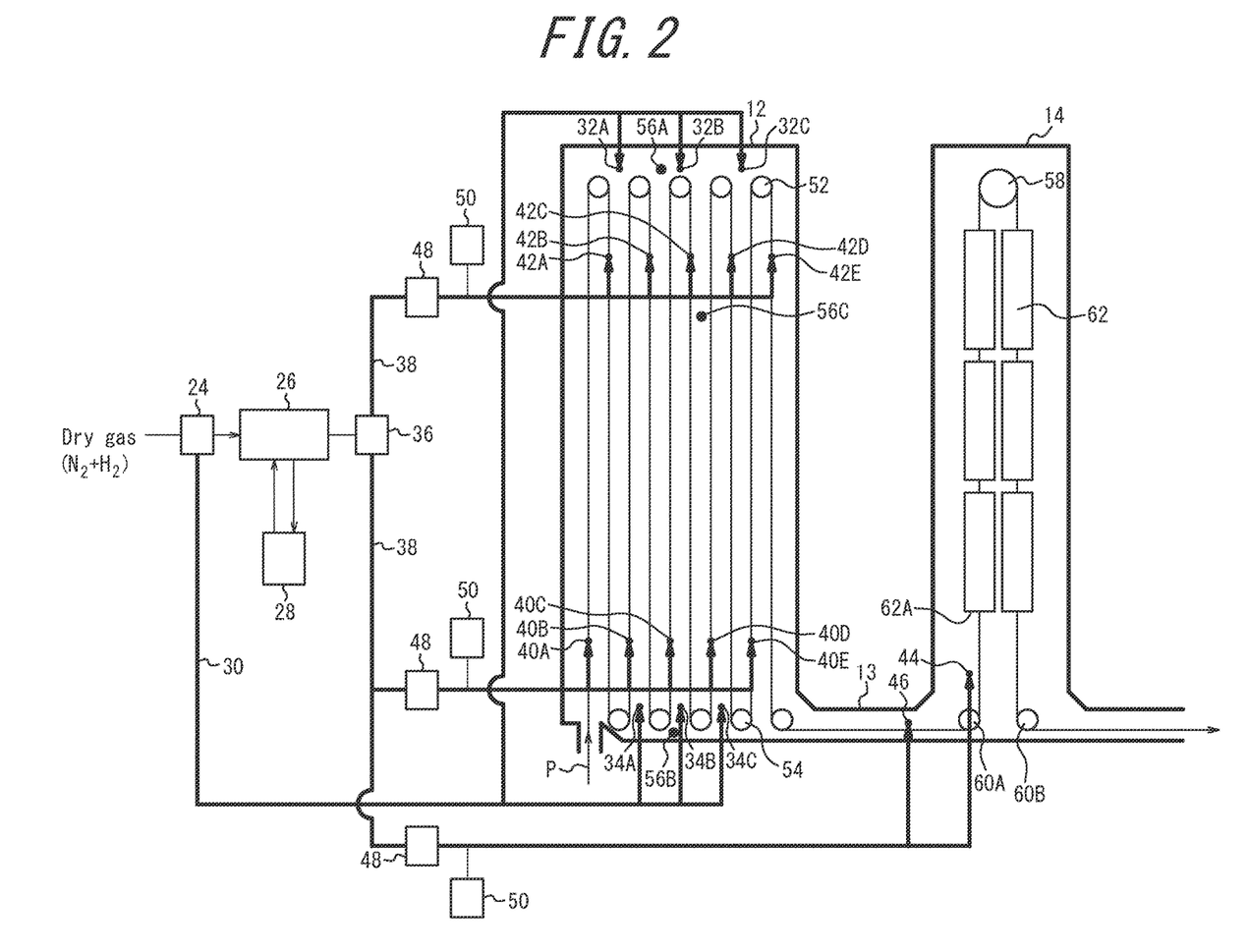
FIG. 2 is a schematic diagram illustrating a system of supplying humidified gas and dry gas to a soaking zone 12 and a system of supplying humidified gas to a first cooling zone 14 in FIG. 1.

FIG. 2 is a schematic diagram illustrating a system of supplying humidified gas and dry gas to the soaking zone 12. In FIG. 2, part of the reducing gas or non-oxidizing gas (dry gas) is fed to a humidifying device 26 by a gas distribution device 24 and the remainder as the dry gas passes through a dry gas pipe 30 and is supplied to the soaking zone 12 through dry gas supply ports 32A, 32B, and 32C provided in the upper portion of the soaking zone and dry gas supply ports 34A, 34B, and 34C provided in the lower portion of the soaking zone. Therefore, the dew point near the hearth rolls can be lowered than that in a center portion of the soaking zone and the occurrence of pick-up defects can be suppressed.

The locations and the number of the dry gas supply ports are not limited to the example illustrated in FIG. 2 and may be determined as appropriate considering various conditions. However, a plurality of dry gas supply ports are preferably arranged at a same height position along the longitudinal direction of the soaking zone and arranged uniformly in the longitudinal direction of the soaking zone.

The humidifying device includes a device which humidifies dry gas by a humidifying method such as a bubbling type, a membrane exchanging type, and a high temperature vapor addition type but the membrane exchanging type is preferable for stabilizing the dew point when the flow rate is changed. The humidifying device 26 illustrated in FIG. 2 includes a humidifying module having a fluorine or polyimide hollow fiber membrane, flat membrane, or the like. Dry gas flows inside the membrane, whereas pure water adjusted to a predetermined temperature in a circulating constant-temperature water bath 28 circulates outside the membrane. The fluorine or polyimide hollow fiber membrane or flat membrane is a type of ion exchange membrane with affinity for water molecules. When moisture content differs between the inside and outside of the hollow fiber membrane, a force for equalizing the moisture content difference emerges and, with this force as a driving force, moisture transmits through the membrane and moves toward the part with lower moisture content. The temperature of dry gas varies with seasonal or daily air temperature change. In this humidifying device, however, heat exchange is possible by ensuring a sufficient contact area between gas and water through the vapor permeable membrane. Accordingly, regardless of whether the dry gas temperature is higher or lower than the circulating water temperature, the dry gas is humidified to the same dew point as the set water temperature, thus achieving highly accurate dew point control. The dew point of the humidified gas can be controlled to any value in the range of 5° C. to 50° C. When the dew point of the humidified gas is higher than the pipe temperature, there is a possibility that dew condensation occurs in the pipe and dew condensation water enters directly into the furnace. The humidified gas pipe is therefore heated/heat-retained to be at or above the dew point of the humidified gas and at or above the external air temperature.

In this embodiment, the humidified gas is supplied through two systems, namely, first humidified gas supply ports 40A to 40E and second humidified gas supply ports 42A to 42E. The gas humidified in the humidifying device 26 is distributed into the two systems by a humidified gas distribution device 36, passed through humidified gas pipes 38, and supplied into the soaking zone 12 via the first humidified gas supply ports 40A to 40E and the second humidified gas supply ports 42A to 42E. The sign 48 represents a humidified gas flowmeter and the sign 50 represents a humidified gas dew point meter.

In this embodiment, from the viewpoint of uniformly dispersing the humidified gas in the soaking zone 12 using a steel sheet accompanying gas flow caused by conveyance of the steel sheet P, the positional relationship between the conveyance direction of the steel sheet P in the soaking zone 12 and the humidified gas supply ports in the soaking zone 12 is important. In this embodiment, the steel sheet P is conveyed in upward and downward directions alternately ten times in the soaking zone 12 while passing through five upper hearth rolls 52 provided at a same height in the upper portion of the soaking zone 12 and five lower hearth rolls 54 provided at a same height in the lower portion of the soaking zone 12, and thus ten passes are formed. The diameter of the upper hearth roll 52 and the lower hearth roll 54, that is, the distance between each adjacent passes is about 800 mm to 1000 mm. On the other hand, the steel sheet accompanying gas flow exists only about 30 mm from the steel sheet surface. Therefore, in this embodiment, in the passes in which the steel sheet P moves upwardly (ascending passes), the humidified gas is supplied from the first humidified gas supply ports 40A to 40E provided at positions that are respectively higher by 1.0 m or more and 5.0 m or less than the centers of the corresponding lower hearth rolls 54 (that is, a height of 1.0 m or more and 5.0 m or less in the upward direction from the centers of the corresponding lower hearth rolls 54) and that respectively overlap the steel sheet in the corresponding passes when viewed from the side of the soaking zone 12. Further, in the passes in which the steel sheet P moves downwardly (descending passes), the humidified gas is supplied from the second humidified gas supply ports 42A to 42E provided at positions that are respectively lower by 1.0 m or more and 5.0 m or less than the centers of the corresponding upper hearth rolls 52 (that is, a height of 1.0 m or more and 5.0 m or less in the downward direction from the centers of the corresponding upper hearth rolls 52) and that respectively overlap the steel sheet in the corresponding passes when viewed from the side of the soaking zone 12. In this specification, the term "side of the soaking zone" means a pair of surfaces which are orthogonal to the axial directions of the upper hearth rolls 52 and the lower hearth rolls 54 (that is, the transverse direction of the steel sheet P) of the furnace walls constituting the soaking zone which is a vertical furnace. FIG. 2 is a figure viewed from the side of the soaking zone 12. The first humidified gas supply ports 40A to 40E and the second humidified gas supply ports 42A to 42E are provided on a pair of side surfaces of the soaking zone.

The humidified gas supplied from the first humidified gas supply ports 40A to 40E is dispersed in an upward direction along with the steel sheet accompanying gas flow in the ascending passes. The humidified gas supplied from the second humidified gas supply ports 42A to 42E is dispersed in a downward direction along with the accompanying gas flow in the descending passes. Therefore, the humidified gas is uniformly dispersed in the soaking zone, and thus a uniform dew point distribution can be obtained. As a result, Si internal oxidation is sufficiently promoted in the soaking zone and the occurrence of pick-up defects can be prevented. Therefore, good coating appearance can be obtained.

When the first humidified gas supply ports 40A to 40E are positioned at a height of less than 1.0 m from the centers of the lower hearth rolls 54, the humidified gas tends to stay near the lower hearth rolls and thus pick-up defects occur in the lower hearth rolls. On the other hand, when the first humidified gas supply ports 40A to 40E are positioned at a height of beyond 5.0 m from the centers of the lower hearth rolls 54, the humidified gas less easily reaches the section from the lower hearth rolls 54 to the first humidified gas supply ports 40A to 40E and thus the dew point is not raised. Therefore, Si internal oxidation becomes insufficient. Accordingly, the first humidified gas supply ports 40A to 40E are provided at positions that are respectively higher by 1.0 m or more and 5.0 m or less than the centers of the corresponding lower hearth rolls 54.

For the same reason, the second humidified gas supply ports 42A to 42E are provided at positions that are respectively lower by 1.0 m or more and 5.0 m or less than the centers of the corresponding upper hearth rolls 52.

The first humidified gas supply ports 40A to 40E are preferably provided at positions that are respectively lower by 2.0 m or more than the centers of the corresponding upper hearth rolls 52 and the second humidified gas supply ports 42A to 42E are preferably provided at positions that are respectively higher by 2.0 m or more than the centers of the corresponding lower hearth rolls 54. This enables the humidified gas to be dispersed more uniformly along with the steel sheet accompanying gas flow in the soaking zone. Further, the humidified gas supplied from the first humidified gas supply ports 40A to 40E is prevented from directly reaching the upper hearth rolls 52 and the humidified gas supplied from the second humidified gas supply ports 42A to 42E is prevented from directly reaching the lower hearth rolls 54, and thus, the occurrence of pick-up defects can be avoided.

The flow rate of the humidified gas supplied to the soaking zone 12 is not particularly limited but approximately maintained within a range of 100 ($Nm^3/hr$) to 400 ($Nm^3/hr$). Further, the flow rate of the dry gas supplied to the soaking zone 12 is not particularly limited but approximately maintained within a range of 10 ($Nm^3/hr$) to 300 ($Nm^3/hr$) in sheet passing of a high tensile strength steel sheet having a chemical composition containing Si in an amount of 0.2 mass % or more.

(Cooling Zone)

In this embodiment, the cooling zones 14 and 16 cool the steel sheet P. The steel sheet P is cooled to about 480° C. to 530° C. in the first cooling zone 14 and cooled to about 470° C. to 500° C. in the second cooling zone 16.

The cooling zones 14 and 16 are also supplied with the reducing gas or non-oxidizing gas. Here, only the dry gas is supplied. The supply of the dry gas to the cooling zones 14 and 16 is not particularly limited, but the dry gas is preferably supplied from at least two supply ports in the height direction and at least two supply ports in the longitudinal direction so that the dry gas is uniformly introduced into the cooling zones. The total gas flow rate of the dry gas supplied to the cooling zones 14 and 16 is measured by a gas flowmeter (not illustrated) provided in the pipe. The total gas flow rate is not particularly limited but may be about 200 (Nm$^3$/hr) to 1000 (Nm$^3$/hr).

The cooling zone 14 is provided with at least one cooling nozzle 62 along the steel sheet conveyance path. The cooling nozzle 62 is a circular pipe having a length longer than the steel sheet width as described in JP 2010-185101 A and is arranged so that the extending direction of the circular pipe is parallel to the width direction of the steel sheet. The circular pipe has, in a portion opposite to the steel sheet, a plurality of through holes at a predetermined interval along the extending direction thereof and water in the circular pipe is sprayed through the through holes to the steel sheet. The cooling nozzles 62 are provided in pairs so as to oppose each other across the front and back surfaces of the steel sheet, and a plurality of pairs (for example, five pairs to ten pairs) of cooling nozzles are arranged at a predetermined interval along the steel sheet conveyance path, constituting one cooling zone. Further, three to six cooling zones are preferably arranged along the steel sheet conveyance path. FIG. 2 illustrates six cooling zones.

In this embodiment, it is desirable that the humidified gas is also supplied from a third humidified gas supply port 44 provided at a position within 3.0 m on an upstream side of the steel sheet conveyance path from a most upstream position 62A of the cooling nozzles (specifically, one of the plurality of cooling nozzles that is nearest to the soaking zone 12). It is also desirable that reducing or non-oxidizing humidified gas is supplied to the communication portion 13 further from a fourth humidified gas supply port 46 provided in the communication portion 13 between the soaking zone and the cooling zone. With regard to the range of humidification in the soaking zone 12, it is most desirable that humidification is performed in a region in which the temperature of the steel sheet is 600° C. to 900° C. from the viewpoint of Si internal oxidation. However, the gas supplied to the soaking zone 12 typically flows to the line upstream direction, i.e., toward the heating zone 10. That is, in conventional methods, only dry gas flows to a region from near the exit of the soaking zone in which the temperature of the steel sheet becomes highest to the position at which cooling with the cooling nozzles 62 is started in the cooling zone 14, and in this region the dew point is not raised, and thus this region does not contribute to Si internal oxidation. Therefore, in this embodiment, the humidified gas supply ports 44 and 46 are also provided in the communication portion 13 between the soaking zone and the cooling zone and near the entrance of the cooling zone 14 such that the humidified gas is also supplied therefrom. This can promote Si internal oxidation. Further, when alloying process is performed, the alloying temperature is sufficiently lowered and thus the tensile strength can be further increased. When viewed from the side surfaces of the cooling zone and the communication portion, the distance between the humidified gas supply ports 44 and 46 and the steel sheet is preferably set to 50 mm or less.

To control the dew point inside the soaking zone and near the hearth rolls, dew point meters are preferably provided at a dew point measuring port 56A near the upper hearth rolls of the soaking zone, a dew point measuring port 56B near the lower hearth rolls, and a dew point measuring port 56C in the center portion of the soaking zone. Then, in the inside of the soaking zone 12, the dew points near (i.e., at a position less than 1.0 m from) the upper hearth rolls and the lower hearth rolls which are measured at, for example, the dew point measuring ports 56A and 56B (upper portion dew point and lower portion dew point) are maintained at −10° C. or lower and the dew point at a position of 1.0 m or more apart from the upper hearth rolls and the lower hearth rolls which is measured at, for example, the dew point measuring port 56C (internal dew point) is preferably maintained at −20° C. or higher and 0° C. or lower.

(Hot-Dip Galvanizing Bath)

The hot-dip galvanizing bath 22 can be used to apply a hot-dip galvanized coating onto the steel sheet P discharged from the second cooling zone 16. The hot-dip galvanizing may be performed according to a usual method. As mentioned above, in a hot-dip galvanized steel sheet produced according to this embodiment, good coating appearance can be obtained because Si internal oxidation is sufficiently promoted to improve the coating adhesion properties and the occurrence of pick-up defects is suppressed.

(Alloying Line)

The alloying line 23 can be used to heat-alloy the galvanized coating applied on the steel sheet P. The alloying treatment may be performed according to a usual method. In this embodiment, the alloying temperature is kept from being high, thus suppressing a decrease in tensile strength of the produced hot-dip galvanized steel sheet. However, the alloying line 23 is an optional line in the continuous hot-dip galvanizing apparatus of this disclosure and the alloying process is an optional process in the method for producing a hot-dip galvanized steel sheet of this disclosure.

(Chemical Composition of Steel Sheet)

The steel sheet P subjected to annealing and hot-dip galvanizing is not particularly limited, but the advantageous effects can be effectively achieved in the case where the steel sheet has a chemical composition containing Si in amount of 0.2 mass % or more, that is, the steel sheet is a high tensile strength steel sheet. The following describes a preferred chemical composition of the steel sheet. When components are expressed in "%" in the following description, this refers to "mass %".

Since C forms a retained austenite phase, a martensite phase, and the like as a steel microstructure, allowing the workability to be easily improved, the C content is preferably 0.025% or more, but in this disclosure, the lower limit of the C content is not particularly limited. On the other hand, a C content beyond 0.3% deteriorates the weldability, and thus, the C content is preferably set to 0.3% or less.

Because Si is an effective element for strengthening steel to obtain good material properties, Si is added to a high strength steel sheet in an amount of 0.2% or more. When the Si content is less than 0.2%, an expensive alloying element is required to obtain high strength. On the other hand, a Si content beyond 2.5% suppresses the formation of an oxide layer during oxidation treatment. Further, a Si content beyond 2.5% raises the alloying temperature, making it difficult to obtain desired mechanical properties. Therefore, the Si content is preferably set to 2.5% or less.

Mo is an effective element for increasing strength of steel. To secure a tensile strength of 590 MPa or more, Mo is preferably contained in an amount of 0.5% or more. On the other hand, a Mn content beyond 3.0% may make it difficult to secure the weldability, coating adhesion properties, balance between strength and ductility. Therefore, the Mn content is preferably set in a range of 0.5% to 3.0%. When the tensile strength is 270 MPa to 440 MPa, Mn is added as appropriate in an amount of 1.5% or less.

P is an effective element for increasing the strength of steel, but delays the alloying reaction of zinc and steel. Therefore, when Si is added to steel in an amount of 0.2% or more, the P content is preferably set to 0.03% or less and in other cases, P is added as appropriate depending on the strength.

The effect of S on the steel strength is small but S affects the formation of an oxide layer during hot rolling and cold rolling. Therefore, the S content is preferably set to 0.005% or less.

In addition to the above elements, for example, at least one selected from the group consisting of Cr, Mo, Ti, Nb, V, B, and the like can be optionally added, and the balance is Fe and inevitable impurities.

EXAMPLES

Examples 1 and 2

The continuous hot-dip galvanizing apparatus illustrated in FIGS. 1 and 2 was used to subject each steel sheet whose chemical composition is listed in Table 1 to annealing under the corresponding annealing condition listed in Table 2, and then hot-dip galvanize the steel sheet to produce a hot-dip galvanized steel sheet (GI). In some examples, the steel sheets were also subjected to alloying treatment to produce galvannealed steel sheets (GAs).

A RT furnace having the volume of 200 m³ was used as the heating zone. The average temperature inside the heating zone was 700° C. to 800° C. As dry gas, gas (dew point: −50° C.) having a composition containing 15 vol % $H_2$ with the balance being $N_2$ and inevitable impurities was used for the heating zone. The dry gas flow rate to the heating zone was 100 Nm³/hr.

A RT furnace having the volume of 700 m³, the distance between upper hearth rolls and lower hearth rolls of 20 m, and the height of 24 m was used as the soaking zone. The target steel sheet temperature on the exit of the soaking zone and the steel sheet temperature actually measured on the exit of the soaking zone were as listed in Table 2. As dry gas, gas (dew point: −50° C.) having a composition containing 15 vol % $H_2$ with the balance being $N_2$ and inevitable impurities was used. Part of the dry gas was humidified by a humidifying device having a hollow fiber membrane-type humidifying portion, to prepare humidified gas. The hollow fiber membrane-type humidifying portion had ten membrane modules, in each of which circulating water of 100 L/min at the maximum were flown.

Dry gas supply ports and humidified gas supply ports were arranged at the positions illustrated in FIG. 2. Five first humidified gas supply ports for ascending passes were provided at positions that are respectively higher by 1.5 m to 4.0 m than the centers of the corresponding lower hearth rolls and that are respectively lower by 16.0 m to 18.5 m than the centers of the corresponding upper hearth rolls. Five second humidified gas supply ports for descending passes were provided at positions that are respectively lower by 2.0 m to 4.5 m than the centers of the corresponding upper hearth rolls and that are respectively higher by 15.5 m to 18.0 m than the centers of the corresponding lower hearth rolls.

The dry gas (dew point: −50° C.) was supplied to the first and second cooling zones from their lowest portions with the flow rate listed in Table 2. Further, as listed in Table 2, in Example 2 (No. 5), the humidified gas was supplied from the fourth humidified gas supply port 46 in the communication portion and the third gas supply port 44 in the entrance of the first cooling zone. The third humidified gas supply port 44 was at a position of 1.5 m on the upstream side of the steel sheet conveyance path from the most upstream position of the cooling nozzles and the fourth humidified gas supply port 46 was at a position of 2.8 m on the upstream side of the steel sheet conveyance path from the most upstream position of the cooling nozzles. In Example 1, the third humidified gas supply port 44 and the fourth humidified gas supply port 46 were not provided.

In the examples in which hot-dip galvanized steel sheets (GIs) were produced, the temperature of the molten bath was set to 450° C., the Al concentration in the molten bath was set to 0.200%, and the coating weight was adjusted to 60 g/m² per surface by gas wiping.

In the examples in which galvannealed steel sheets (GAs) were produced, the temperature of the molten bath was set to 460° C., the Al concentration in the molten bath was set to 0.130%, and the coating weight was adjusted to 50 g/m² per surface by gas wiping. After the hot-dip galvanizing, alloying treatment was performed in an induction heating-type alloying furnace so that the coating alloying degree (Fe content) was 10% to 13%. The alloying temperature in the treatment is listed in Table 2.

Comparative Examples 1 to 3

GIs and GAs were produced as in Example 1 except that the positions of the humidified gas supply ports in the soaking zone were changed. In Comparative Example 1, the humidified gas supply ports were provided only in the lower portion of the soaking zone. Five humidified gas supply ports were provided at positions of 5.5 m from the lower hearth rolls near the ascending passes. Five humidified gas supply ports were provided at positions of 1.5 m from the lower hearth rolls near the descending passes. The humidified gas supply ports respectively overlap the positions of the steel sheet in the corresponding passes when viewed from the side of the soaking zone.

In Comparative Example 2, the humidified gas supply ports were provided in the upper and lower portions of the soaking zone. Five humidified gas supply ports were provided at positions of 0.9 m from the lower hearth rolls near the ascending passes. Five humidified gas supply ports were provided at positions of 3.5 m from the upper hearth rolls near the descending passes. The gas supply ports respectively overlap the positions of the steel sheet in the corresponding passes when viewed from the side of the soaking zone.

In Comparative Example 3, each humidified gas supply port was provided at the same position in the vertical direction of the soaking zone as in Example 1, except for being arranged at a position between adjacent passes.

(Evaluation Method)

The coating appearance was evaluated through inspection by an optical surface defect inspection machine (detection of non-coating defects or pick-up defects of ϕ0.5 or more) and visual determination of alloying unevenness (for GAs) or visual determination of appearance (for GIs). Samples accepted on all criteria were rated "excellent", samples passed the inspection with the surface defect inspection machine and having a low degree of alloying unevenness or uneven appearance that would cause no problem in quality were rated "good", samples having alloying unevenness or uneven appearance that would lower the surface quality grade were rated "fair", and samples failed the inspection with the surface defect inspection machine were rated "poor". The results are listed in Table 2.

Further, the tensile strength of GIs and GAs produced under various conditions was measured. High tensile strength steel with steel sample ID A was rated as "passed" when the tensile strength was 780 MPa or more, high tensile strength steel with steel sample ID B was rated as "passed" when the tensile strength was 1180 MPa or more, and high tensile strength steel with steel sample ID C was rated as "passed" when the tensile strength was 980 MPa or more. The results are listed in Table 2.

TABLE 1

The balance: Fe and inevitable impurities (mass %)

| Steel sample ID | Chemical composition | | | | | Target temperature in soaking zone Exit temperature (° C.) |
|---|---|---|---|---|---|---|
| | C | Si | Mn | P | S | |
| A | 0.10 | 0.2 | 2.4 | 0.02 | 0.001 | 800 ± 15 |
| B | 0.10 | 0.9 | 2.8 | 0.01 | 0.001 | 850 ± 15 |
| C | 0.11 | 1.5 | 2.7 | 0.01 | 0.001 | 830 ± 15 |

TABLE 2

| No | Steel sample ID | Sheet width (m) | Sheet passing speed V (m/s) | Target steel sheet temperature on exit (° C.) | Measured steel sheet temperature on exit (° C.) | Dry gas flow rate (Nm³/hr) | Humidified gas flow rate (Nm³/hr) | Humidified gas dew point (° C.) | Internal dew point (° C.) | Upper portion dew point (° C.) | Lower portion dew point (° C.) | Communication portion Humidified gas flow rate (Nm³/hr) |
|---|---|---|---|---|---|---|---|---|---|---|---|---|
| 1 | A | 1.4 | 1.5 | 800 | 803 | 270 | 150 | 20 | −18.2 | −17.0 | −5.2 | 0 |
|   | B | 1.2 | 1.5 | 850 | 851 | 100 | 350 | 18 | −11.3 | −7.7 | −2.3 | 0 |
|   | C | 1.0 | 1.5 | 830 | 833 | 150 | 300 | 19 | −13.7 | −9.5 | −2.7 | 0 |
|   | A | 1.4 | 1.5 | 800 | 801 | 270 | 150 | 20 | −18.5 | −16.3 | −4.9 | 0 |
|   | B | 1.2 | 1.5 | 850 | 847 | 100 | 350 | 18 | −12.1 | −7.5 | −3.1 | 0 |
|   | C | 1.0 | 1.5 | 830 | 831 | 150 | 300 | 19 | −13.9 | −8.9 | −3.5 | 0 |
| 2 | A | 1.4 | 1.5 | 800 | 805 | 270 | 150 | 20 | −17.7 | −26.2 | −6.3 | 0 |
|   | B | 1.2 | 1.5 | 850 | 848 | 100 | 350 | 18 | −10.3 | −20.1 | −3.5 | 0 |
|   | C | 1.0 | 1.5 | 830 | 830 | 150 | 300 | 19 | −14.6 | −18.5 | −4.9 | 0 |
|   | A | 1.4 | 1.5 | 800 | 797 | 270 | 150 | 20 | −18.5 | −27.3 | −7.1 | 0 |
|   | B | 1.2 | 1.5 | 850 | 847 | 100 | 350 | 18 | −12.1 | −19.2 | −2.8 | 0 |
|   | C | 1.0 | 1.5 | 830 | 832 | 150 | 300 | 19 | −14.0 | −17.4 | −4.1 | 0 |
| 3 | A | 1.4 | 1.5 | 800 | 799 | 270 | 150 | 20 | −15.1 | −25.5 | −27.2 | 0 |
|   | B | 1.2 | 1.5 | 850 | 850 | 100 | 350 | 18 | −9.8 | −20.1 | −24.3 | 0 |
|   | C | 1.0 | 1.5 | 830 | 832 | 150 | 300 | 19 | −11.7 | −18.8 | −25.1 | 0 |
|   | A | 1.4 | 1.5 | 800 | 803 | 270 | 150 | 20 | −14.9 | −25.2 | −31.5 | 0 |
|   | B | 1.2 | 1.5 | 850 | 846 | 100 | 350 | 18 | −11.3 | −19.9 | −24.4 | 0 |
|   | C | 1.0 | 1.5 | 830 | 829 | 150 | 300 | 19 | −11.7 | −17.3 | −22.2 | 0 |
| 4 | A | 1.4 | 1.5 | 800 | 800 | 270 | 150 | 20 | −15.3 | −25.3 | −32.1 | 0 |
|   | B | 1.2 | 1.5 | 850 | 848 | 100 | 350 | 18 | −10.2 | −20.3 | −25.3 | 0 |
|   | C | 1.0 | 1.5 | 830 | 828 | 150 | 300 | 19 | −11.4 | −19.1 | −23.1 | 0 |
|   | A | 1.4 | 1.5 | 800 | 803 | 270 | 150 | 20 | −14.9 | −27.3 | −33.7 | 0 |
|   | B | 1.2 | 1.5 | 850 | 852 | 100 | 350 | 18 | −10.5 | −18.8 | −24.4 | 0 |
|   | C | 1.0 | 1.5 | 830 | 828 | 150 | 300 | 19 | −11.2 | −17.3 | −22.2 | 0 |
| 5 | A | 1.4 | 1.5 | 800 | 798 | 270 | 150 | 20 | −14.9 | −26.5 | −20.1 | 20 |
|   | B | 1.2 | 1.5 | 850 | 850 | 100 | 350 | 18 | −10.3 | −21.2 | −13.2 | 60 |
|   | C | 1.0 | 1.5 | 830 | 829 | 150 | 300 | 19 | −11.9 | −22.3 | −14.7 | 60 |
|   | A | 1.4 | 1.5 | 800 | 800 | 270 | 150 | 20 | −14.6 | −28.1 | −19.3 | 20 |
|   | B | 1.2 | 1.5 | 850 | 855 | 100 | 350 | 18 | −11.1 | −17.2 | −12.1 | 60 |
|   | C | 1.0 | 1.5 | 830 | 827 | 150 | 300 | 19 | −12.2 | −16.3 | −14.9 | 60 |

| No | Steel sample ID | Communication portion Humidified gas dew point (° C.) | Cooling zone Dry gas flow rate (Nm³/hr) | Humidified gas flow rate (Nm³/hr) | Humidified gas dew point (° C.) | Alloying treatment GA/GI | Alloying temperature (° C.) | Coating appearance | Material strength Tensile strength (MPa) | Overall determination passed/failed | Classification |
|---|---|---|---|---|---|---|---|---|---|---|---|
| 1 | A | — | 700 | 0 | — | GA | 543 | fair | 753 | failed | Comparative Example 1 |
|   | B | — | 700 | 0 | — | GA | 532 | poor | 1158 | failed | |
|   | C | — | 700 | 0 | — | GA | 520 | poor | 982 | failed | |
|   | A | — | 700 | 0 | — | GI | not performed | fair | 810 | failed | |

TABLE 2-continued

| | | | | | | | | | | | |
|---|---|---|---|---|---|---|---|---|---|---|---|
| | B | — | 700 | 0 | — | GI | not performed | poor | 1210 | failed | |
| | C | — | 700 | 0 | — | GI | not performed | poor | 1025 | failed | |
| 2 | A | — | 700 | 0 | — | GA | 514 | fair | 791 | failed | Com- |
| | B | — | 700 | 0 | — | GA | 510 | poor | 1190 | failed | parative |
| | C | — | 700 | 0 | — | GA | 513 | poor | 984 | failed | Example |
| | A | — | 700 | 0 | — | GI | not performed | fair | 812 | failed | 2 |
| | B | — | 700 | 0 | — | GI | not performed | poor | 1202 | failed | |
| | C | — | 700 | 0 | — | GI | not performed | poor | 1020 | failed | |
| 3 | A | — | 700 | 0 | — | GA | 514 | fair | 793 | failed | Com- |
| | B | — | 700 | 0 | — | GA | 510 | fair | 1188 | failed | parative |
| | C | — | 700 | 0 | — | GA | 512 | fair | 989 | failed | Example |
| | A | — | 700 | 0 | — | GI | not performed | fair | 808 | failed | 3 |
| | B | — | 700 | 0 | — | GI | not performed | fair | 1209 | failed | |
| | C | — | 700 | 0 | — | GI | not performed | fair | 1020 | failed | |
| 4 | A | — | 700 | 0 | — | GA | 515 | good | 790 | passed | Example |
| | B | — | 700 | 0 | — | GA | 513 | good | 1185 | passed | 1 |
| | C | — | 700 | 0 | — | GA | 510 | good | 986 | passed | |
| | A | — | 700 | 0 | — | GI | not performed | good | 809 | passed | |
| | B | — | 700 | 0 | — | GI | not performed | good | 1205 | passed | |
| | C | — | 700 | 0 | — | GI | not performed | good | 1033 | passed | |
| 5 | A | 20 | 700 | 30 | 20 | GA | 495 | excellent | 808 | passed | Example |
| | B | 20 | 700 | 50 | 20 | GA | 502 | excellent | 1203 | passed | 2 |
| | C | 20 | 700 | 50 | 20 | GA | 498 | excellent | 1027 | passed | |
| | A | 20 | 700 | 30 | 20 | GI | not performed | excellent | 811 | passed | |
| | B | 20 | 700 | 50 | 20 | GI | not performed | excellent | 1213 | passed | |
| | C | 20 | 700 | 50 | 20 | GI | not performed | excellent | 1036 | passed | |

(Evaluation Results)

In the column of overall determination in Table 2, samples are labeled as "passed" for their good coating appearance and satisfactory tensile strength, or "failed" otherwise. In Examples 1 and 2, even though the total gas flow rate was changed, a predetermined moisture content could be stably supplied, and thus the coils yielded good surface appearance across its entire length and entire width and had no outliers of mechanical properties. In contrast, none of Comparative Examples 1 to 3 yielded good coating appearance.

INDUSTRIAL APPLICABILITY

According to the method for producing a hot-dip galvanized steel sheet and the continuous hot-dip galvanizing apparatus of this disclosure, good coating appearance can be obtained with high coating adhesion properties in the case of hot-dip galvanizing a steel sheet whose Si content is 0.2 mass % or more.

REFERENCE SIGNS LIST

100 Continuous hot-dip galvanizing apparatus
10 Heating zone
12 Soaking zone
14 First cooling zone (rapid cooling zone)
16 Second cooling zone (slow cooling zone)
11, 13, 15 Throat
18 Snout
20 Annealing furnace
22 Hot-dip galvanizing bath
23 Alloying line
24 Dry gas distribution device
26 Humidifying device
28 Circulating constant-temperature water bath
30 Dry gas pipe
32A to 32C Dry gas supply port
34A to 34C Dry gas supply port
36 Humidified gas distribution device
38 Humidified gas pipe
40A to 40E First humidified gas supply port (for ascending pass)
42A to 42E Second humidified gas supply port (for descending pass)
44 Third humidified gas supply port (for cooling zone)
46 Fourth humidified gas supply port (for communication portion)
48 Humidified gas flowmeter
50 Humidified gas dew point meter
52 Upper hearth roll
54 Lower hearth roll
56A to 56C Dew point measurement port
58 Upper hearth roll
60A, 60B Lower hearth roll
62 Cooling nozzle
62A Most upstream position of cooling nozzles
P Steel sheet

The invention claimed is:

1. A continuous hot-dip galvanizing apparatus comprising: a vertical annealing furnace in which a heating zone, a soaking zone, and a cooling zone are arranged in this order; and a hot-dip galvanizing line located downstream of the cooling zone, wherein
   the heating zone, the soaking zone, and the cooling zone each has, in its upper portion, at least one upper hearth roll and, in its lower portion, at least one lower hearth roll to convey a steel sheet in an upward direction to form one pass and in a downward direction to form another pass along a steel sheet conveyance path in the heating zone, the soaking zone, and the cooling zone,
   the soaking zone has, in the pass in which the steel sheet moves upward, a first humidified gas supply port to supply a first humidified gas having a dew point of 10° C. to 30° C. to the soaking zone, the first humidified gas supply port provided at a position that is higher by 1.0 m or more and 5.0 m or less than the center of the lower hearth roll and that overlaps the steel sheet in the pass when viewed from the side of the soaking zone,
   the soaking zone has, in the pass in which the steel sheet moves downward, a second humidified gas supply port to supply a second humidified gas having a dew point of 10° C. to 30° C. to the soaking zone, the second humidified gas supply port provided at a position that is lower by 1.0 m or more and 5.0 m or less than the center of the upper hearth roll and that overlaps the steel sheet in the pass when viewed from the side of the soaking zone, and
   the first humidified gas supply port is provided only for an ascending pass and the second humidified gas supply port is provided only for a descending pass.

2. The continuous hot-dip galvanizing apparatus according to claim 1, wherein the first humidified gas supply port is provided at a position that is lower by 2.0 m or more than the center of the upper hearth roll and the second humidified gas supply port is provided at a position that is higher by 2.0 m or more than the center of the lower hearth roll.

3. The continuous hot-dip galvanizing apparatus according to claim 1, further comprising:
   at least one cooling nozzle provided along the steel sheet conveyance path in the cooling zone; and
   a third humidified gas supply port to supply a third humidified gas having a dew point of 10° C. to 30° C. to the cooling zone, the third humidified gas supply port provided at a position within 3.0 m on an upstream side of the steel sheet conveyance path from a most upstream position of the cooling nozzle.

4. The continuous hot-dip galvanizing apparatus according to claim 3, further comprising a fourth humidified gas supply port provided in a communication portion connecting the soaking zone and the cooling zone, the fourth humidified gas supply port for supplying a fourth humidified gas having a dew point of 10° C. to 30° C. to the communication portion.

5. The continuous hot-dip galvanizing apparatus according to claim 1, further comprising an alloying line located downstream of the hot-dip galvanizing line.

6. The continuous hot-dip galvanizing apparatus according to claim 1, wherein the soaking zone has a height of 20 m or more and 40 m or less.

* * * * *